(12) United States Patent
Jung et al.

(10) Patent No.: US 7,968,670 B2
(45) Date of Patent: Jun. 28, 2011

(54) POLYIMIDE RESIN AND LIQUID CRYSTAL ALIGNMENT LAYER AND POLYIMIDE FILM USING THE SAME

(75) Inventors: Hak Gee Jung, Yongin (KR); Sang Wook Park, Yongin (KR); Hyo Jun Park, Yongin (KR)

(73) Assignee: Kolon Industries, Inc., Gwacheo-si (KR)

( * ) Notice: Subject to any disclaimer, the term of this patent is extended or adjusted under 35 U.S.C. 154(b) by 113 days.

(21) Appl. No.: 12/517,972

(22) PCT Filed: Dec. 13, 2007

(86) PCT No.: PCT/KR2007/006513
§ 371 (c)(1),
(2), (4) Date: Jun. 5, 2009

(87) PCT Pub. No.: WO2008/072915
PCT Pub. Date: Jun. 19, 2008

(65) Prior Publication Data
US 2010/0317821 A1  Dec. 16, 2010

(30) Foreign Application Priority Data

Dec. 15, 2006  (KR) .................. 10-2006-0129011

(51) Int. Cl.
*C08G 63/00* (2006.01)
*C08G 63/02* (2006.01)
(52) U.S. Cl. ........ 528/183; 428/1.26; 428/220; 528/184
(58) Field of Classification Search ................ 428/1.26, 428/220; 528/183, 184
See application file for complete search history.

(56) References Cited

U.S. PATENT DOCUMENTS

2010/0051423 A1* 3/2010 Kim et al. .................... 198/846

FOREIGN PATENT DOCUMENTS

| JP | 2001-296525 A | 10/2001 |
| JP | 2003-107486 A | 4/2003 |
| JP | 2007-304509 A | 11/2007 |
| KR | 2000-0020048 A | 4/2000 |
| WO | 2006/126555 A1 | 11/2006 |

* cited by examiner

*Primary Examiner* — Terressa M Boykin
(74) *Attorney, Agent, or Firm* — Sughrue Mion, PLLC

(57) ABSTRACT

Disclosed is a polyimide resin, which is colorless and transparent and has superior properties, including mechanical properties and heat stability, and thus is usable in various fields, including semiconductor insulating films, TFT-LCD insulating films, transparent electrode films, passivation films, liquid crystal alignment layers, optical communication materials, protective films for solar cells, and flexible display substrates. Also, a liquid crystal alignment layer and a polyimide film using the polyimide resin are provided.

16 Claims, 1 Drawing Sheet

POLYIMIDE RESIN AND LIQUID CRYSTAL ALIGNMENT LAYER AND POLYIMIDE FILM USING THE SAME

CROSS REFERENCE TO RELATED APPLICATIONS

This application is a National Stage of International Application No. PCT/KR2007/006513 filed Dec. 13, 2007, claiming priority based on Korean Patent Application No. 10-2006-0129011 filed Dec. 15, 2006, the contents of all of which are incorporated herein by reference in their entirety.

TECHNICAL FIELD

The present invention relates to a polyimide resin that is colorless and transparent, and to a liquid crystal alignment layer and a polyimide film using the same.

BACKGROUND ART

Generally, polyimide (PI) resin refers to highly heat-resistant resin obtained by ring closure and dehydration of polyamic acid at high temperature, which is obtained by solution polymerization of aromatic dianhydride and aromatic diamine or aromatic diisocyanate. For the preparation of the polyimide resin, the aromatic dianhydride includes, for example, pyromellitic dianhydride (PMDA) or biphenyl tetracarboxylic dianhydride (BPDA), and the aromatic diamine includes, for example, oxydianiline (ODA), p-phenylene diamine (p-PDA), m-phenylene diamine (m-PDA), methylene dianiline (MDA), and bisaminophenylhexafluoropropane (HFDA).

Since polyimide resin, which is insoluble, infusible and super high heat resistant, has superior properties, including heat and oxidation resistance, radiation resistance, cryogenic resistance properties, and chemical resistance, it has been used in various fields, including advanced heat resistant materials, such as automobile materials, aircraft materials, or spacecraft materials, and electronic materials, such as insulation coating agents, insulating films, semiconductors, or electrode protective films of TFT-LCDs. Recently, polyimide resin has been used as display materials, such as optical fibers or liquid crystal alignment layers, and transparent electrode films, which are constructed by mixing conductive fillers with polymers or applying conductive fillers to the surface of polymer films.

However, a high aromatic ring density and a charge transfer interaction of polyimide resin cause it to be colored brown or yellow, undesirably resulting in low transmittance in the visible light range. Such yellow or brown color of polyimide resin makes it difficult to apply it to the fields requiring transparency.

In order to solve such problems, attempts to realize methods of purifying a monomer and a highly pure solvent in order to be polymerized have been made, but the improvement in transmittance was not large.

U.S. Pat. No. 5,053,480 discloses a method of using an alicyclic dianhydride component instead of the aromatic dianhydride. Although this method improves transparency and color in a solution phase or a film phase compared to the purification methods, the improvement in transmittance is limited, and therefore high transmittance is not realized, and also, the thermal and mechanical properties thereof are deteriorated.

In U.S. Pat. Nos. 4,595,548, 4,603,061, 4,645,824, 4,895,972, 5,218,083, 5,093,453, 5,218,077, 5,367,046, 5,338,826, 5,986,036, and 6,232,428, and Korean Unexamined Patent Publication No. 2003-0009437, there have been reports related to the preparation of polyimide, having a novel structure, which is improved in terms of transmittance and color transparency within a range in which the thermal properties are not greatly decreased, using aromatic dianhydride and aromatic diamine monomers, having a linker, such as —O—, —$SO_2$—, or $CH_2$—, a bent structure due to connection not at the p-position but at the m-position, or a substituent, such as —$CF_3$. However, such a polyimide can be confirmed to have mechanical properties, a yellow index, and visible light transmittance insufficient for use in semiconductor insulating films, TFT-LCD insulating films, electrode protective films, and flexible display substrates.

DISCLOSURE

Technical Problem

Accordingly, the present invention provides a polyimide resin, which is colorless and transparent and has superior properties, including mechanical properties and heat stability, and also provides a liquid crystal alignment layer and a polyimide film using the same.

Technical Solution

According to a first embodiment of the present invention, there is provided a polyimide resin, which is prepared from a polymer of aromatic dianhydride and aromatic diamine, the aromatic dianhydride comprising 4,4'-(4,4'-isopropylidenediphenoxy)bis(phthalic anhydride) (6-HBDA) and 4-(2,5-dioxotetrahydrofuran-3-yl)-1,2,3,4-tetrahydronaphthalene-1,2-dicarboxylic anhydride (TDA), and the aromatic diamine comprising one or a mixture of two or more selected from among diamine having a flexible group and diamine containing fluorine.

In the first embodiment, the diamine having a flexible group may comprise one or a mixture of two or more selected from among oxydianiline (ODA), 1,3-bis(3-aminophenoxy)benzene (APB-133), 1,3-bis(4-aminophenoxy)benzene (APB-134), 1,4-bis(4-aminophenoxy)benzene (APB-144), bis(3-aminophenyl)sulfone (3-DDS), bis(4-aminophenyl)sulfone (4-DDS), 2,2'-bis[4(4-aminophenoxy)phenyl]hexafluoropropane (4-BDAF), 2,2'-bis[3(3-aminophenoxy)phenyl]hexafluoropropane (3-BDAF), and 2,2-bis[4-(4-aminophenoxy)phenyl]propane (6-HMDA).

In the first embodiment, the diamine containing fluorine may comprise one or a mixture of two or more selected from among 2,2'-bis(trifluoromethyl)-4,4'-diaminobiphenyl (2,2'-TFDB), 3,3'-bis(trifluoromethyl)-4,4'-diaminobiphenyl (3,3'-TFDB), 2,2'-bis[4(4-aminophenoxy)phenyl]hexafluoropropane (4-BDAF), and 2,2'-bis[3(3-aminophenoxy)phenyl]hexafluoropropane (3-BDAF).

In the polyimide resin according to the first embodiment, the aromatic dianhydride may further comprise 2,2-bis(3,4-dicarboxyphenyl)hexafluoropropane dianhydride (6-FDA).

In the polyimide resin according to the first embodiment, the 4,4'-(4,4'-isopropylidenediphenoxy)bis (phthalic anhydride) (6-HBDA) may be used in an amount of 1~99 mol %, based on the total amount of the aromatic dianhydride.

In the polyimide resin according to the first embodiment, the one or mixture of two or more selected from among diamine having a flexible group and diamine containing fluorine may be used in an amount of 10~90 mol %, based on the total amount of the diamine.

According to a second embodiment of the present invention, a liquid crystal alignment layer comprising the polyimide resin mentioned above is provided.

The liquid crystal alignment layer according to the second embodiment may have a pretilt angle of 0~2°.

According to a third embodiment of the present invention, a polyimide film comprising the polyimide resin mentioned above is provided.

The polyimide film according to the third embodiment may have average transmittance of 85% or more at 380~780 nm and average transmittance of 88% or more at 551~780 nm, according to measurement of transmittance using a UV spectrophotometer, based on a film thickness of 50~100 μm.

The polyimide film according to the third embodiment may have transmittance of 88% or more at 550 nm, transmittance of 85% or more at 500 nm, and transmittance of 50% or more at 420 nm, according to the measurement of transmittance using a UV spectrophotometer, based on the film thickness of 50~100 μm.

The polyimide film according to the third embodiment may have a yellow index of 15 or less based on the film thickness of 50~100 μm.

The polyimide film according to the third embodiment may have a dielectric constant of 3.0 or less at 1 GHz based on the film thickness of 50~100 μm.

The polyimide film according to the third embodiment may have an average coefficient of thermal expansion of 50 ppm or less at 50~200° C., based on the film thickness of 50~100 μm.

The polyimide film according to the third embodiment may have a modulus of 3.0 GPa or more, based on the film thickness of 50~100 μm.

The polyimide film according to the third embodiment may have a 50% UV cut-off wavelength of 400 nm or less, based on the film thickness of 50~100 μm.

Advantageous Effects

The present invention can provide a polyimide resin that is colorless and transparent and has superior properties, including mechanical properties and heat stability, and that can thus be used in various fields, including semiconductor insulating films, TFT-LCD insulating films, passivation films, liquid crystal alignment layers, optical communication materials, protective films for solar cells, and flexible display substrates, and also provide a liquid crystal alignment layer and a polyimide film using the same.

DESCRIPTION OF THE REFERENCE NUMERALS IN THE DRAWING

Figure 1:
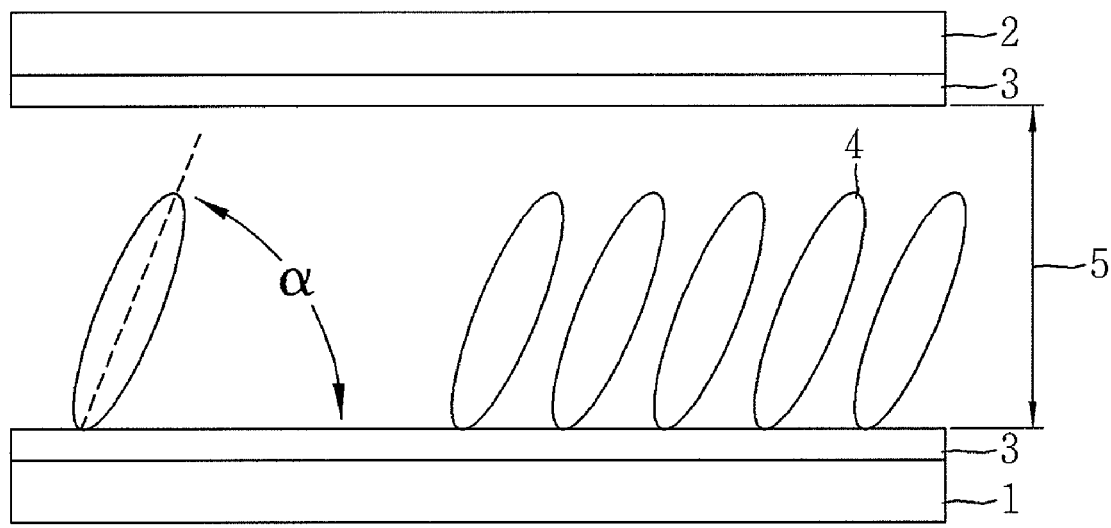
FIG. 1 illustrates a liquid crystal alignment layer manufactured using the polyimide resin of the present invention.

1, 2: glass substrate
3: alignment layer
4: liquid crystal molecules
5: liquid crystal layer
α: pretilt angle

BEST MODE

Hereinafter, a detailed description of the present invention will be given.

The present invention is directed to a polyimide resin, which is composed of a copolymer of diamine and dianhydride, and a liquid crystal alignment layer and a polyimide film using the same, and, in particular, to a colorless transparent polyimide resin and a liquid crystal alignment layer and a polyimide film using the same.

To this end, the aromatic dianhydride used in the present invention essentially includes 4,4'-(4,4'-isopropylidenediphenoxy)bis(phthalic anhydride) (6-HBDA) and 4-(2,5-dioxotetrahydrofuran-3-yl)-1,2,3,4-tetrahydronaphthalene-1,2-dicarboxylic anhydride (TDA).

In addition, the aromatic dianhydride may further include 2,2-bis(3,4-dicarboxyphenyl)hexafluoropropane dianhydride (6-FDA).

The 6-HBDA is used in an amount of 1~99 mol %, and preferably 10~90 mol %, based on the total amount of the dianhydride.

Thereby, it is possible to prepare polyamic acid that is transparent and has high visible light transmittance a low UV absorption and yellow index, and a high viscosity.

The aromatic diamine used in the present invention essentially includes diamine having a flexible group or diamine containing fluorine.

The diamine having a flexible group is diamine, the main chain of which contains a flexible group, such as an ether group, a methylene group, a propargyl group, a hexafluoropropargyl group, a carbonyl group, a sulfone group, or a sulfide group. Specific examples of the diamine having a flexible group include, but are not limited to, 4,4'-oxydianiline, 3,3'-oxydianiline, 3,4'-oxydianiline, 2,4'-oxydianiline, 1,3-bis(4-aminophenoxy)benzene, 1,3-bis(3-aminophenoxy)benzene, 4,4'-bis(3-aminophenoxy)biphenyl, 4,4'-bis(4-aminophenoxy)biphenyl, bis(4-(3-aminophenoxy)phenyl)sulfone, 4,4'-diaminodiphenylpropane, 4,4'-diaminodiphenylmethane, 4,4'-diaminodiphenylsulfide, 3,3'-diaminodiphenylsulfone, 4,4'-diaminodiphenylsulfone, 4,4'-diaminodiphenyldiethylsilane, 4,4'-4,4'-diaminodiphenylethylphosphineoxide, 4,4'-diaminodiphenyl-N-methylamine, 4,4'-diaminodiphenyl-N-phenylamine, 1,3-diaminobenzene, and 1,2-diaminobenzene.

As the diamine, useful is any one or a mixture of two or more selected from among diamine having a flexible group and diamine containing fluorine.

In the present invention, the diamine having a flexible group includes one or a mixture of two or more selected from among oxydianiline (ODA), 1,3-bis(3-aminophenoxy)benzene (APB-133), 1,3-bis(4-aminophenoxy)benzene (APB-134), 1,4-bis(4-aminophenoxy)benzene (APB-144), bis(3-aminophenyl)sulfone (3-DDS), bis(4-aminophenyl)sulfone (4-DDS), 2,2'-bis[4-(4-aminophenoxy)phenyl]hexafluoropropane (4-BDAF), 2,2'-bis[3-(3-aminophenoxy)phenyl]hexafluoropropane (3-BDAF), and 2,2-bis[4-(4-aminophenoxy)phenyl]propane (6-HMDA). The diamine containing fluorine includes one or a mixture of two or more selected from among 2,2'-bis(trifluoromethyl)-4,4'-diaminobiphenyl (2,2'-TFDB), 3,3'-bis(trifluoromethyl)-4,4'-diaminobiphenyl (3,3'-TFDB), 2,2'-bis[4(4-aminophenoxy)phenyl]hexafluoropropane (4-BDAF), and 2,2'-bis[3(3-aminophenoxy)phenyl]hexafluoropropane (3-BDAF).

The one or mixture of two or more selected from among the diamine having a flexible group and the diamine containing fluorine is used in an amount of 10~90 mol %, and preferably 20~80 mol %, based on the total amount of the diamine. Thereby, high transmittance and transparency can be realized, and electrical properties, thermal properties, and mechanical properties can be improved.

The dianhydride and the diamine are dissolved in equivalent molar amounts in an organic solvent and are then reacted, thus preparing a polyamic acid solution.

The reaction conditions are not particularly limited, but include a reaction temperature of −20~80° C. and a reaction time of 2~48 hours. Furthermore, the reaction is preferably conducted in an inert atmosphere of argon or nitrogen.

The organic solvent that is used for the solution polymerization of the monomers is not particularly limited, as long as polyamic acid can be dissolved therein. As known reaction solvents, useful are one or more polar solvents selected from among m-cresol, N-methyl-2-pyrrolidone (NMP), dimethylformamide (DMF), dimethylacetamide (DMAc), dimethylsulfoxide (DMSO), acetone, and diethylacetate. In addition, a low-boiling-point solvent, such as tetrahydrofuran (THF) or chloroform, or a low-absorbing-solvent, such as γ-butyrolactone, may be used.

The amount of the organic solvent is not particularly limited, but is preferably 50~95 wt %, and more preferably 70~90 wt %, based on the total amount of the polyamic acid solution, in order to realize appropriate molecular weight and viscosity of a polyamic acid solution.

The polyamic acid solution thus obtained is imidized to thus prepare a polyimide resin having a glass transition temperature of 200~350° C.

In order to form a liquid crystal alignment layer using the polyamic acid prepared from the above monomers, the polyamic acid is subjected to spin coating or roll coating on a glass substrate (e.g., ITO glass), and then to thermal curing at 80° C. for 5 min and 250° C. for 20 min, thus realizing polyimidization during the removal of the solvent. Thereby, a thin film (having a thickness of about 10~1000 nm) is formed on the glass substrate. For improvement of coating ability or surface flatness and application to a process, the polyamic acid solution is used in a state of being diluted to have an appropriate coating solution viscosity of 10~50 cps. The solvent used for dilution is not limited to the solvent for polymerization. The known dilution solvent is exemplified by polar solvents, such as N-methyl-2-pyrrolidone (NMP), dimethylformamide (DMF), dimethylacetamide (DMAc), γ-butyrolactone, and 2-n-butoxyethanol, which may be used alone or in mixtures thereof.

Useful for the formation of the liquid crystal alignment layer, a coating solution of the polyamic acid prepared from the above monomers may be prepared through one or more processes selected from among the coating solution preparation processes below:

1. A process of using a polyamic acid solution,
2. A process of subjecting a polyamic acid polymer to thermal curing and/or chemical curing for polyimidization, to precipitation for formation of a resin, and then to dissolution in an organic solvent, thus preparing a solution as a coating solution,
3. A process of subjecting a polyamic acid polymer to thermal curing and/or chemical curing for polyimidization as in 2 (without the formation of a resin), thus preparing a coating solution,
4. A process of mixing the solutions of 1 and 2 or 3, thus preparing a coating solution, and
5. A process of adding (dissolving) the resin of 2 to the polyamic acid solution of 1, thus preparing a coating solution.

The coating solutions prepared through the above processes may be subjected to two or more steps of filtration using filters having a pore size selected within the range of 0.1~5 μm and an ion filter just before the coating process.

In the case where the polyimide resin of the present invention is used to form the liquid crystal alignment layer, a stable pretilt angle is realized. The term "pretilt angle" indicates an angle by which liquid crystals are previously tilted in order to increase a speed of response to voltage, when voltage is applied to liquid crystals to arrange the liquid crystals in a predetermined orientation. The liquid crystal alignment layer including the polyimide resin of the present invention shows a stable pretilt angle of 0~2°, and may thus be applied to an alignment layer for IPS (In-Plane Switching) modes requiring a pretilt angle of less than 2°.

In addition, when a polyimide film is manufactured using the polyamic acid solution, a filler may be added to the polyamic acid solution so as to improve various properties of the polyimide film, including sliding properties, heat conductivity, electrical conductivity, and corona resistance. The filler is not particularly limited, but specific examples thereof include silica, titanium oxide, layered silica, carbon nanotubes, alumina, silicon nitride, boron nitride, calcium hydrogen phosphate, calcium phosphate, and mica.

The particle size of the filler may vary depending on the properties of the film to be modified and the type of filler to be added, and is not particularly limited. The average particle size thereof is preferably set within 0.001~50 μm, more preferably 0.005~25 μm, and still more preferably 0.01~10 μm. In this case, the polyimide film may be easily and effectively modified and may also exhibit good surface properties, electrical conductivity, and mechanical properties.

The amount of the filler may vary depending on the properties of the film to be modified and the particle size of the filler, and is not particularly limited. The filler is added in an amount of 0.001~20 parts by weight, and preferably 0.01~10 parts by weight, based on 100 parts by weight of the polyamic acid solution.

The method of adding the filler is not particularly limited, but includes, for instance, adding the filler to the polyamic acid solution before or after polymerization, kneading the filler using a 3 roll mill after completion of the polymerization of polyamic acid, or mixing a dispersion solution containing the filler with the polyamic acid solution.

The method of manufacturing the polyimide film from the polyamic acid solution thus obtained is not particularly limited, and any conventionally known methods may be used. The imidization of the polyamic acid solution includes, for example, thermal imidization and chemical imidization. Particularly useful is chemical imidization. Chemical imidization is conducted by adding a dehydrating agent, including acid anhydride, such as acetic anhydride, and an imidization catalyst, including tertiary amine, such as isoquinoline, β-picoline, or pyridine, to the polyamic acid solution. The chemical imidization may be conducted along with the thermal imidization, and heating conditions may vary depending on the type of polyamic acid solution and the thickness of the film.

The polyimide film is obtained by heating the polyamic acid solution on a substrate at 80~200° C., and preferably 100~180° C. to activate the dehydrating agent and the imidization catalyst, performing partial curing and drying to obtain a polyamic acid film in a gel state, separating the polyamic acid film from the substrate, and heating the film in a gel state at 200~400° C. for 5~400 sec.

The thickness of the polyimide film thus obtained is not particularly limited, but is preferably set within 10~250 μm, and more preferably 25~150 μm, in consideration of the application field thereof.

The polyimide film manufactured in the present invention has transmittance of 88% or more at 550 nm, 85% or more at 500 nm, and 50% or more at 420 nm, according to measurement of transmittance using a UV spectrophotometer, based on a film thickness of 50~100 μm. Further, the average transmittance thereof is 85% or more at 380~780 nm, and is 88% or more at 551~780 nm.

The polyimide film has a yellowing index of 15 or less based on the film thickness of 50~100 μm.

The polyimide film of the present invention, satisfying the aforementioned transmittance and yellowing index, may be used in fields requiring transparency, in which it is difficult to apply a conventional polyimide film due to the yellow color thereof, including protective films, or diffusion sheets and coating films of TFT-LCDs, for example, interlayers, gate insulators, and liquid crystal alignment layers of TFT-LCDs. When the transparent polyimide is applied to the liquid crystal alignment layer, it contributes to an increase in porosity, thus enabling the fabrication of a TFT-LCD having a high contrast ratio, and may also be used for flexible display substrates.

The polyimide film of the present invention has a dielectric constant of 3.0 or less at 1 GHz, and may thus be used as a semiconductor passivation film.

The polyimide film of the present invention has an average coefficient of thermal expansion (average CTE) of 50 ppm or less at 50~200° C. In the case where the average CTE exceeds 50 ppm, the polyimide film may shrink or expand, depending on the variation in process temperatures, when applied to a TFT array process for placing a TFT on the film, resulting in unrealized alignment in an electrode doping process. Further, the film does not remain flat, and thus may warp. Hence, as the CTE is decreased, the TFT process may be more accurately conducted.

The polyimide film of the present invention has a modulus of 3.0 GPa or more. In this case, the polyimide film may be more easily applied to a roll-to-roll process for a flexible display substrate. When the polyimide film is used as a substrate film for flexible displays and FCCLs, a roll-to-roll process is conducted. At this time, because the film is subjected to tension when it is wound on and released from the rolls, a film having a modulus of less than 3.0 GPa may break down.

The polyimide film of the present invention has a 50% cut-off wavelength of 400 nm or less according to the measurement of transmittance using a UV spectrophotometer. Therefore, the polyimide film of the present invention may be used as a surface protective film for solar cells.

MODE FOR INVENTION

A better understanding of the present invention may be obtained through the following examples which are set forth to illustrate, but are not to be construed as the limit of the present invention.

Example 1

While nitrogen was passed through a 100 ml three-neck round bottom flask reactor equipped with a stirrer, a nitrogen inlet, a dropping funnel, a temperature controller and a condenser, 30.986 g of N,N-dimethylacetamide (DMAc) was loaded thereto, the temperature of the reactor was decreased to 0° C., and 3.2023 g (0.01 mol) of 2,2'-TFDB was dissolved therein. This solution was maintained at 0° C. To the solution, 3.64355 g (0.007 mol) of 6-HBDA and 0.90078 g (0.003 mol) of TDA were added and the mixture was stirred for 1 hour till the 6-HBDA and TDA were completely dissolved. The solid content was 20 wt %. The resulting solution was stirred at room temperature for 8 hours, thus producing a polyamic acid solution with a viscosity of 2000 cps at 23° C.

Thereafter, the polyamic acid solution was spread 500~1000 μm thick on a glass substrate using a doctor blade, and was then dried in a vacuum oven at 40° C. for 1 hour and at 60° C. for 2 hours, thus affording a self-supporting film. The film was then cured in a high-temperature oven at 80° C. for 3 hours, 100° C. for 1 hour, 200° C. for 1 hour, and 300° C. for 30 min at a heating rate of 5° C./min, thereby affording polyimide films having a thickness of 50 μm and 100 μm.

Example 2

As in Example 1, 2.483 g (0.01 mol) of 4-DDS was dissolved in 28.1093 g of DMAc, and this solution was maintained at 0° C. To the solution 3.64355 g (0.007 mol) of 6-HBDA and 0.90078 g (0.003 mol) of TDA were sequentially added and the solution was stirred for 1 hour till the 6-HBDA and TDA were completely dissolved. The solid content of the solution was 20 wt %. The solution was then stirred at room temperature for 8 hours, thus affording a polyamic acid solution having a viscosity of 1800 cps at 23° C.

Thereafter, polyimide films were manufactured in the same manner as in Example 1.

Example 3

As in Example 1, 5.1846 g (0.01 mol) of 4-BDAF was dissolved in 38.9157 g of DMAc, and this solution was maintained at 0° C. To the solution 3.64355 g (0.007 mol) of 6-HBDA and 0.90078 g (0.003 mol) of TDA were sequentially added the solution was stirred for 1 hour till the 6-HBDA and TDA were completely dissolved. The solid content of the solution was 20 wt %. The solution was then stirred at room temperature for 8 hours, thus affording a polyamic acid solution having a viscosity of 2000 cps at 23° C.

Thereafter, polyimide films were manufactured in the same manner as in Example 1.

Example 4

As in Example 1, 2.24161 g (0.007 mol) of 2,2'-TFDB and 0.7449 g (0.003 mol) of 4-DDS were completely dissolved in 30.3628 g of DMAc. This solution was maintained at 0° C. To the solution 3.6435 g (0.007 mol) of 6-HBDA and 0.96069 g (0.003 mol) of TDA were sequentially added thereto and stirred for 1 hour till the 6-HBDA and TDA were completely dissolved. The solid content of the solution was 20 wt %. The solution was then stirred at room temperature for 8 hours, thus affording a polyamic acid solution having a viscosity of 1700 cps at 23° C.

Thereafter, polyimide films were manufactured in the same manner as in Example 1.

Example 5

As in Example 1, 3.62922 g (0.007 mol) of 3-BDAF and 0.7449 g (0.003 mol) of 4-DDS were completely dissolved in 35.91324 g of DMAc. This solution was maintained at 0° C. To the solution 3.6435 g (0.007 mol) of 6-HBDA and 0.96069 g (0.003 mol) of TDA were sequentially added thereto and stirred for 1 hour till the 6-HBDA and TDA were completely dissolved. The solid content of the solution was 20 wt %. The solution was then stirred at room temperature for 8 hours, thus affording a polyamic acid solution having a viscosity of 1700 cps at 23° C.

Thereafter, polyimide films were manufactured in the same manner as in Example 1.

Example 6

As in Example 1, 2.24161 g (0.007 mol) of 2,2'-TFDB and 1.55538 g (0.003 mol) of 3-BDAF was added thereto and completely dissolved in 33.60472 g of DMAc. This solution was maintained at 0° C. To the solution, 3.6435 g (0.007 mol) of 6-HBDA and 0.96069 g (0.003 mol) of TDA were sequentially added thereto and stirred for 1 hour till the 6-HBDA and TDA were completely dissolved. The solid content of the solution was 20 wt %. The solution was then stirred at room temperature for 8 hours, thus affording a polyamic acid solution having a viscosity of 1800 cps at 23° C.

Thereafter, polyimide films were manufactured in the same manner as in Example 1.

Comparative Example 1

As in Example 1, 5.1846 g (0.01 mol) of 4-BDAF was dissolved in 38.5084 g of DMAc, after which 4.4425 g (0.01 mol) of 6-FDA was added thereto. The solution was stirred for 1 hour till the 6-FDA was completely dissolved. The solid content was thus 20 wt %. The solution was then stirred at room temperature for 8 hours, thus affording a polyamic acid solution having a viscosity of 1300 cps at 23° C.

Thereafter, polyimide films were manufactured in the same manner as in Example 1, and the thicknesses thereof were 25 μm, 50 μm, and 100 μm.

Comparative Example 2

As in Example 1, 2.9233 g (0.01 mol) of APB-133 was dissolved in 29.4632 g of DMAc, after which 4.4425 g (0.01 mol) of 6-FDA was added thereto. The solution was stirred for 1 hour till the 6-FDA was completely dissolved. The solid content was thus 20 wt %. The solution was then stirred at room temperature for 8 hours, thus affording a polyamic acid solution having a viscosity of 1200 cps at 23° C.

Thereafter, polyimide films were manufactured in the same manner as in Comparative Example 1.

Comparative Example 3

As in Example 1, 2.4830 g (0.01 mol) of 3-DDS was dissolved in 27.702 g of DMAc, after which 4.4425 g (0.01 mol) of 6-FDA was added thereto. The solution was stirred for 1 hour till the 6-FDA was completely dissolved. The solid content was thus 20 wt %. The solution was then stirred at room temperature for 8 hours, thus affording a polyamic acid solution having a viscosity of 1300 cps at 23° C.

Thereafter, polyimide films were manufactured in the same manner as in Comparative Example 1.

Comparative Example 4

As in Example 1, 2.4830 g (0.01 mol) of 4-DDS was dissolved in 27.702 g of DMAc, after which 4.4425 g (0.01 mol) of 6-FDA was added thereto. The solution was stirred for 1 hour till the 6-FDA was completely dissoved. The solid content was thus 20 wt %. The solution was then stirred at room temperature for 8 hours, thus affording a polyamic acid solution having a viscosity of 1400 cps at 23° C.

Thereafter, polyimide films were manufactured in the same manner as in Comparative Example 1.

Comparative Example 5

As in Example 1, 2.0024 g (0.01 mol) of 3,3'-ODA was dissolved in 25.7796 g of DMAc, after which 4.4425 g (0.01 mol) of 6-FDA was added thereto and the resulting solution was stirred for 1 hour till 6-FDA was completely dissoved. The solid content was thus 20 wt %. The solution was then stirred at room temperature for 8 hours, thus affording a polyamic acid solution having a viscosity of 1600 cps at 23° C.

Thereafter, polyimide films were manufactured in the same manner as in Comparative Example 1.

Comparative Example 6

As in Example 1, 2.0024 g (0.01 mol) of 4,4'-ODA was dissolved in 16.7344 g of DMAc, after which 2.1812 g (0.01 mol) of PMDA was added thereto and the resulting solution was stirred for 1 hour till the PMDA was completely dissoved. The solid content was thus 20 wt %. The solution was then stirred at room temperature for 8 hours, thus affording a polyamic acid solution having a viscosity of 2500 poises at 23° C.

Thereafter, polyimide films were manufactured in the same manner as in Comparative Example 1.

Comparative Example 7

As in Example 1, 1.0814 g (0.01 mol) of p-PDA was dissolved in 25.1456 g of DMAc, after which 5.205 g (0.01 mol) of 6-HBDA was added thereto and the resulting solution was stirred for 1 hour till the 6-HBDA was completely dissolved. The solid content was thus 20 wt %. The solution was then stirred at room temperature for 8 hours, thus affording a polyamic acid solution having a viscosity of 1750 cps at 23° C.

Thereafter, polyimide films were manufactured in the same manner as in Comparative Example 1.

The properties of the polyimide films manufactured in the above examples and comparative examples were measured as follows. The results are summarized in Tables 1 to 5 below.

(1) Transmittance and 50% Cut-Off Wavelength

Each of the polyimide films was measured for visible light transmittance and 50% cut-off wavelength using a UV spectrophotometer (Varian, Cary100).

(2) Yellowing Index

The yellowing index was measured according to ASTM E313.

(3) Modulus

The modulus was measured according to JIS K 6301 using a universal testing machine, Model 1000, available from Instron.

(4) Glass Transition Temperature (Tg)

The glass transition temperature was measured using a differential scanning calorimeter (DSC, TA Instrument, Q200).

(5) Coefficient of Thermal Expansion (CTE)

The CTE was measured at 50~200° C. according to a TMA method using a TMA (TA Instrument, Q400).

(6) Dielectric Constant

The dielectric constant was measured according to ASTM D150.

(7) Pretilt Angle

The polyamic acid solution of each of the examples and comparative examples was diluted to have a solution viscosity of 10~50 cps using γ-butyrolactone as a dilution solvent, filtered using filters having sizes of 2 μm, 0.45 μm, and 0.2 μm and then an ion filter, applied on a glass substrate (ITO glass) (application conditions: spin coating, 400~4,000 rpm, 10~40 sec). Each polyamic solution on the glass substrate was thermally cured at 80° C. for 5 min and then 250° C. for 20 min, thus realizing polyimidization during the removal of the solvent. Thereby, a thin film (having a thickness of 100 nm) was formed on the glass substrate. The glass substrate 1, 2 thus coated were positioned for use as upper and lower substrate respectively, after which liquid crystal molecules 4 were introduced into the space between the glass substrate 1, 2, thus affording liquid crystal cells including a liquid crystal layer 5 (FIG. 1). The pretilt angle of each of the liquid crystal cells was measured through a crystal rotation method. The results are shown in Table 5, below.

TABLE 1

|  |  | Composition | Molar Ratio | Thick. (μm) | Transmittance 380 nm~780 nm | 551 nm~780 nm | 550 nm | 500 nm | 420 nm |
|---|---|---|---|---|---|---|---|---|---|
| Ex. | 1 | 6-HBDA + TDA/2,2'-TFDB | 7:3:10 | 50 | 86.7 | 89.1 | 88.9 | 87.3 | 72.7 |
|  | 2 | 6-HBDA + TDA/4-DDS | 7:3:10 | 50 | 87.1 | 89.5 | 89.1 | 87.6 | 74.6 |
|  | 3 | 6-HBDA + TDA/4-BDAF | 7:3:10 | 50 | 86.6 | 89.2 | 89.0 | 87.2 | 72.9 |
|  | 4 | 6-HBDA + TDA/2,2'-TFDB + 4-DDS | 7:3:7:3 | 50 | 88.4 | 90.1 | 89.6 | 89.2 | 70.7 |
|  | 5 | 6-HBDA + TDA/3-BDAF + 4-DDS | 7:3:7:3 | 50 | 85.7 | 89.0 | 88.8 | 87.4 | 63.8 |
|  | 6 | 6-HBDA + TDA/2,2'-TFDB + 3-BDAF | 7:3:7:3 | 50 | 87.0 | 88.5 | 88.2 | 87.2 | 57.6 |
| Ex. | 1 | 6-HBDA + TDA/2,2'-TFDB | 7:3:10 | 100 | 85.8 | 88.7 | 88.3 | 85.7 | 68.4 |
|  | 2 | 6-HBDA + TDA/4-DDS | 7:3:10 | 100 | 86.5 | 89.2 | 88.6 | 86.0 | 70.2 |
|  | 3 | 6-HBDA + TDA/4-BDAF | 7:3:10 | 100 | 86.0 | 88.8 | 88.4 | 85.8 | 68.8 |
|  | 4 | 6-HBDA + TDA/2,2'-TFDB + 4-DDS | 7:3:7:3 | 100 | 87.8 | 89.7 | 89.2 | 88.3 | 66.5 |
|  | 5 | 6-HBDA + TDA/3-BDAF + 4-DDS | 7:3:7:3 | 100 | 85.2 | 88.6 | 88.4 | 86.0 | 60.2 |
|  | 6 | 6-HBDA + TDA/2,2'-TFDB + 3-BDAF | 7:3:7:3 | 100 | 86.5 | 88.2 | 88.1 | 86.1 | 53.1 |

TABLE 2

|  |  | Composition | Molar Ratio | Thick. (μm) | Yellow. | 50% Cut-off (nm) | Modulus (GPa) | Tg (°C.) | CTE (ppm/°C.) | Dielectric./1 GHz |
|---|---|---|---|---|---|---|---|---|---|---|
| Ex. | 1 | 6-HBDA + TDA/2,2'-TFDB | 7:3:10 | 50 | 2.87 | 386 | 3.26 | 236 | 47 | 2.78 |
|  | 2 | 6-HBDA + TDA/4-DDS | 7:3:10 | 50 | 4.08 | 386 | 3.07 | 225 | 48 | 2.74 |
|  | 3 | 6-HBDA + TDA/4-BDAF | 7:3:10 | 50 | 7.67 | 389 | 3.12 | 241 | 46 | 2.59 |
|  | 4 | 6-HBDA + TDA/2,2'-TFDB + 4-DDS | 7:3:7:3 | 50 | 2.45 | 384 | 3.12 | 220 | 45 | 2.86 |
|  | 5 | 6-HBDA + TDA/3-BDAF + 4-DDS | 7:3:7:3 | 50 | 6.5 | 394 | 3.05 | 231 | 47 | 2.61 |
|  | 6 | 6-HBDA + TDA/2,2'-TFDB + 3-BDAF | 7:3:7:3 | 50 | 3.86 | 388 | 3.06 | 218 | 46 | 2.9 |
| Ex. | 1 | 6-HBDA + TDA/2,2'-TFDB | 7:3:10 | 100 | 3.67 | 388 | 3.31 | — | 46 | — |
|  | 2 | 6-HBDA + TDA/4-DDS | 7:3:10 | 100 | 5.12 | 389 | 3.13 | — | 47 | — |
|  | 3 | 6-HBDA + TDA/4-BDAF | 7:3:10 | 100 | 8.47 | 391 | 3.21 | — | 46 | — |
|  | 4 | 6-HBDA + TDA/2,2'-TFDB + 4-DDS | 7:3:7:3 | 100 | 3.35 | 388 | 3.18 | — | 43.7 | — |
|  | 5 | 6-HBDA + TDA/3-BDAF + 4-DDS | 7:3:7:3 | 100 | 7.5 | 396 | 3.12 | — | 46.7 | — |
|  | 6 | 6-HBDA + TDA/2,2'-TFDB + 3-BDAF | 7:3:7:3 | 100 | 4.76 | 390 | 3.12 | — | 45.5 | — |

TABLE 3

|  |  | Composition | Molar Ratio | Thick. (μm) | Transmittance 380 nm~780 nm | 551 nm~780 nm | 550 nm | 500 nm | 420 nm |
|---|---|---|---|---|---|---|---|---|---|
| C. Ex. | 1 | 6-FDA/4-BDAF | 10:10 | 25 | 82.8 | 90.0 | 87.2 | 86.0 | 63.1 |
|  | 2 | 6-FDA/APB-133 | 10:10 | 25 | 84.4 | 89.3 | 87.8 | 86.0 | 77.3 |
|  | 3 | 6-FDA/3-DDS | 10:10 | 25 | 84.3 | 88.6 | 89.7 | 88.6 | 66.5 |
|  | 4 | 6-FDA/4-DDS | 10:10 | 25 | 84.6 | 89.4 | 90.5 | 90.0 | 72.5 |
|  | 5 | 6-FDA/3,3'-ODA | 10:10 | 25 | 84.9 | 89.8 | 90.0 | 87.6 | 77.1 |
|  | 6 | PMDA/ODA | 10:10 | 25 | 56.6 | 85.2 | 73 | 35.0 | 0.05 |
|  | 7 | 6-HBDA/p-PDA | 10:10 | 25 | 69.3 | 88.2 | 82.1 | 52.2 | 8.6 |
| C. Ex. | 1 | 6-FDA/4-BDAF | 10:10 | 50 | 82.2 | 89.7 | 86.8 | 85.1 | 60.0 |
|  | 2 | 6-FDA/APB-133 | 10:10 | 50 | 83.8 | 88.8 | 87.2 | 84.8 | 73.2 |
|  | 3 | 6-FDA/3-DDS | 10:10 | 50 | 83.7 | 88.2 | 89.1 | 87.6 | 63.1 |
|  | 4 | 6-FDA/4-DDS | 10:10 | 50 | 83.9 | 89.1 | 90.0 | 89.1 | 69.4 |
|  | 5 | 6-FDA/3,3'-ODA | 10:10 | 50 | 84.3 | 89.3 | 89.2 | 86.3 | 73.8 |
|  | 6 | PMDA/ODA | 10:10 | 50 | 56.0 | 84.5 | 69.2 | 33.1 | 0 |
|  | 7 | 6-HBDA/p-PDA | 10:10 | 50 | 67.6 | 87.8 | 80.5 | 49.8 | 3.9 |
| C. Ex. | 1 | 6-FDA/4-BDAF | 10:10 | 100 | 81.6 | 89.2 | 86.3 | 84.3 | 51.2 |
|  | 2 | 6-FDA/APB-133 | 10:10 | 100 | 83.1 | 88.1 | 86.7 | 84.3 | 63.3 |

TABLE 3-continued

| | | Molar Ratio | Thick. (μm) | Transmittance | | | | |
|---|---|---|---|---|---|---|---|---|
| | Composition | | | 380 nm~780 nm | 551 nm~780 nm | 550 nm | 500 nm | 420 nm |
| 3 | 6-FDA/3-DDS | 10:10 | 100 | 83.1 | 87.8 | 88.5 | 87.0 | 53.5 |
| 4 | 6-FDA/4-DDS | 10:10 | 100 | 83.2 | 88.8 | 89.5 | 88.6 | 58.6 |
| 5 | 6-FDA/3,3'-ODA | 10:10 | 100 | 83.5 | 88.7 | 88.8 | 85.4 | 62.1 |
| 6 | PMDA/ODA | 10:10 | 100 | — | — | — | — | — |
| 7 | 6-HBDA/p-PDA | 10:10 | 100 | 54.7 | 83.5 | 77.1 | 56.6 | 0 |

TABLE 4

| | | Composition | Molar Ratio | Thick. (μm) | Yellow. | 50% Cut-off (nm) | Modulus (GPa) | Tg (° C.) | CTE (ppm/° C.) | Dielectric/ 1 GHz |
|---|---|---|---|---|---|---|---|---|---|---|
| C. Ex. | 1 | 6-FDA/4-BDAF | 10:10 | 25 | 9.7 | 411 | 3.0 | 263 | 52.3 | 2.5 |
| | 2 | 6-FDA/APB-133 | 10:10 | 25 | 5.5 | 395 | 3.05 | 206 | 47.1 | 2.7 |
| | 3 | 6-FDA/3-DDS | 10:10 | 25 | 1.82 | 388 | 3.1 | 270 | 47 | 3.0 |
| | 4 | 6-FDA/4-DDS | 10:10 | 25 | 1.68 | 382 | 3.1 | 310 | 46 | 3.1 |
| | 5 | 6-FDA/3,3'-ODA | 10:10 | 25 | 5.29 | 396 | 3.0 | 244 | 41 | 2.73 |
| | 6 | PMDA/ODA | 10:10 | 25 | 91.7 | 514 | 3.0 | No | 26 | 3.3 |
| | 7 | 6-HBDA/p-PDA | 10:10 | 25 | 73.2 | 497 | 3.1 | 268 | 33 | 3.4 |
| C. Ex. | 1 | 6-FDA/4-BDAF | 10:10 | 50 | 11.2 | 413 | 3.06 | — | 51.1 | — |
| | 2 | 6-FDA/APB-133 | 10:10 | 50 | 6.9 | 398 | 3.11 | — | 46.0 | — |
| | 3 | 6-FDA/3-DDS | 10:10 | 50 | 2.95 | 392 | 3.16 | — | 45.3 | — |
| | 4 | 6-FDA/4-DDS | 10:10 | 50 | 2.81 | 386 | 3.17 | — | 45.1 | — |
| | 5 | 6-FDA/3,3'-ODA | 10:10 | 50 | 6.46 | 399 | 3.05 | — | 39.6 | — |
| | 6 | PMDA/ODA | 10:10 | 50 | — | — | 3.12 | — | 25.0 | — |
| | 7 | 6-HBDA/p-PDA | 10:10 | 50 | 83.6 | 500 | 3.03 | — | 30 | — |
| C. Ex. | 1 | 6-FDA/4-BDAF | 10:10 | 100 | 23.4 | 415 | 3.09 | — | 48.8 | — |
| | 2 | 6-FDA/APB-133 | 10:10 | 100 | 14.2 | 401 | 3.14 | — | 44.5 | — |
| | 3 | 6-FDA/3-DDS | 10:10 | 100 | 4.54 | 396 | 3.20 | — | 44.9 | — |
| | 4 | 6-FDA/4-DDS | 10:10 | 100 | 4.26 | 390 | 3.22 | — | 44.6 | — |
| | 5 | 6-FDA/3,3'-ODA | 10:10 | 100 | 14.26 | 405 | 3.13 | — | 39.1 | — |
| | 6 | PMDA/ODA | 10:10 | 100 | — | — | — | — | — | — |
| | 7 | 6-HBDA/p-PDA | 10:10 | 100 | 94.8 | 527 | 3.08 | — | 29 | — |

TABLE 5

| | | Composition | Molar Ratio | Pretilt Angle (°) |
|---|---|---|---|---|
| Ex. | 1 | 6-HBDA + TDA/2,2'-TFDB | 7:3:10 | 1.3 |
| | 2 | 6-HBDA + TDA/4-DDS | 7:3:10 | 1.4 |
| | 3 | 6-HBDA + TDA/4-BDAF | 7:3:10 | 1.6 |
| | 4 | 6-HBDA + TDA/2,2'-TFDB + 4-DDS | 7:3:7:3 | 1.5 |
| | 5 | 6-HBDA + TDA/3-BDAF + 4-DDS | 7:3:7:3 | 1.5 |
| | 6 | 6-HBDA + TDA/2,2'-TFDB + 3-BDAF | 7:3:7:3 | 1.4 |
| C. Ex. | 1 | 6-FDA/4-BDAF | 10:10 | 3.5 |
| | 2 | 6-FDA/APB-133 | 10:10 | 3.2 |
| | 3 | 6-FDA/3-DDS | 10:10 | 3.1 |
| | 4 | 6-FDA/4-DDS | 10:10 | 3.1 |
| | 5 | 6-FDA/3,3'-ODA | 10:10 | 2.7 |
| | 6 | PMDA/ODA | 10:10 | 1.2 |
| | 7 | 6-HBDA/p-PDA | 10:10 | 1.5 |

As is apparent from the results of measurement of the properties, including the transmittance and yellowing index, the polyimide films of the present invention had transmittance of 88% or more at 550 nm, 85% or more at 500 nm, and 50% or more at 420 nm in the visible light range, even though they were 50 μm or 100 μm thick. Furthermore, the average transmittance thereof was 85% or more at 380~780 nm and 88% or more at 551~780 nm, and the yellow index thereof was consistently low. Thereby, the polyimide film of the present invention was confirmed to be very transparent.

In the comparative examples, there was no case in which the average transmittance of the film was 85% or more in the visible light range of 380~780 nm, regardless of the thickness thereof. In addition, in Comparative Example 6, a polyimide film having a thickness of 90 μm or more could not be manufactured.

The polyimide films manufactured in the examples of the present invention had a wavelength of 400 nm or less, at which transmittance was 50%, ultimately realizing a colorless transparent polyimide film having superior visible light transmittance. Thus, the polyimide film of the present invention can be used as a surface protective film for solar cells. In addition, because the polyimide film has an average CTE of 50 ppm or less, it can exhibit high dimensional stability, and furthermore, can manifest film properties, necessary for application to a roll-to-roll process, thanks to the modulus of 3.0 GPa or more thereof. Moreover, the polyimide film of the present invention can be applied to a TFT process for fabricating flexible display substrates and active displays, and also has a dielectric constant of 3.0 or less, thus enabling it to be used as a semiconductor passivation film.

The liquid crystal alignment layer manufactured using the polyimide resin of the present invention has a pretilt angle of 2° or less, and thus can be used as an alignment layer for IPS modes.

The invention claimed is:
1. A polyimide resin, which is prepared from a polymer of aromatic dianhydride and aromatic diamine, the aromatic dianhydride comprising 4,4'-(4,4'-isopropylidenediphenoxy) bis(phthalic anhydride) (HBDA) and 4-(2,5-dioxotetrahydrofuran-3-yl)-1,2,3,4-tetrahydronaphthalene-1,2-dicarboxylic anhydride (TDA), and the aromatic diamine comprising one or a mixture of two or more selected from among diamine having a flexible group and diamine containing fluorine.

2. The polyimide resin according to claim 1, wherein the diamine having a flexible group comprises one or a mixture of two or more selected from among oxydianiline (ODA), 1,3-bis(3-aminophenoxy)benzene (APB-133), 1,3-bis(4-aminophenoxy)benzene (APB-134), 1,4-bis(4-aminophenoxy)benzene (APB-144), bis(3-aminophenyl)sulfone (3-DDS), bis(4-aminophenyl)sulfone (4-DDS), 2,2'-bis[4(4-aminophenoxy)phenyl]hexafluoropropane (4-BDAF), 2,2'-bis[3 (3-aminophenoxy)phenyl]hexafluoropropane (3-BDAF), and 2,2-bis[4-(4-aminophenoxy)phenyl]propane (6-HMDA).

3. The polyimide resin according to claim 1, wherein the diamine containing fluorine comprises one or a mixture of two or more selected from among 2,2'-bis(trifluoromethyl)-4,4'-diaminobiphenyl (2,2'-TFDB), 3,3'-bis(trifluoromethyl)-4,4'-diaminobiphenyl (3,3'-TFDB), 2,2'-bis[4(4-aminophenoxy)phenyl]hexafluoropropane (4-BDAF), and 2,2'-bis[3(3-aminophenoxy)phenyl]hexafluoropropane (3-BDAF).

4. The polyimide resin according to claim 1, wherein the aromatic dianhydride further comprises 2,2-bis(3,4-dicarboxyphenyl)hexafluoropropane dianhydride (6-FDA).

5. The polyimide resin according to claim 1, wherein the 4,4'-(4,4'-isopropylidenediphenoxy)bis(phthalic anhydride) (HBDA) is used in an amount of 1~99 mol %, based on a total amount of the aromatic dianhydride.

6. The polyimide resin according to claim 1, wherein the one or mixture of two or more selected from among diamine having a flexible group and diamine containing fluorine is used in an amount of 10~90 mol %, based on a total amount of the diamine.

7. A liquid crystal alignment layer, comprising the polyimide resin of any one of claim 1.

8. The liquid crystal alignment layer according to claim 7, which has a pretilt angle of 0~2°.

9. A polyimide film, comprising the polyimide resin of claim 1.

10. The polyimide film according to claim 9, which has average transmittance of 85% or more at 380~780 nm and average transmittance of 88% or more at 551~780 nm, according to measurement of transmittance using a UV spectrophotometer, based on a film thickness of 50~100 μm.

11. The polyimide film according to claim 9, which has transmittance of 88% or more at 550 nm, transmittance of 85% or more at 500 nm, and transmittance of 50% or more at 420 nm, according to measurement of transmittance using a UV spectrophotometer, based on a film thickness of 50~100 μm.

12. The polyimide film according to claim 9, which has a yellowing index of 15 or less based on a film thickness of 50~100 μm.

13. The polyimide film according to claim 9, which has a dielectric constant of 3.0 or less at 1 GHz based on a film thickness of 50~100 μm.

14. The polyimide film according to claim 9, which has an average coefficient of thermal expansion of 50 ppm or less at 50~200° C. based on a film thickness of 50~100 μm.

15. The polyimide film according to claim 9, which has a modulus of 3.0 GPa or more based on a film thickness of 50~100 μm.

16. The polyimide film according to claim 9, which has a 50% cut-off wavelength of 400 nm or less, according to measurement of transmittance using a UV spectrophotometer, based on the film thickness of 50~100 μm.

* * * * *